(No Model.)
J. T. HAMBAY.
MANUFACTURE OF PIPE COUPLINGS.
No. 361,509. Patented Apr. 19, 1887.
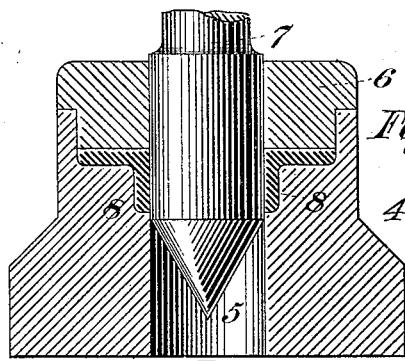
Fig.1.
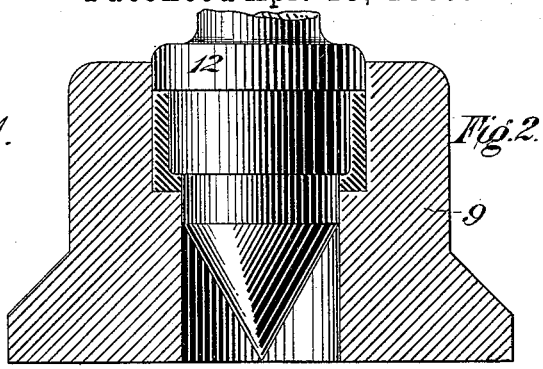
Fig.2.
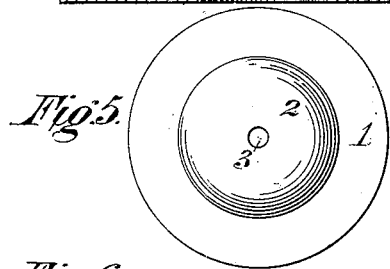
Fig.5.
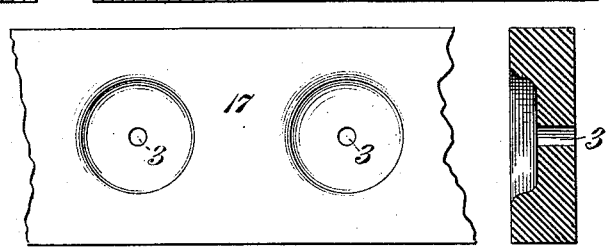
Fig.8. Fig.9.
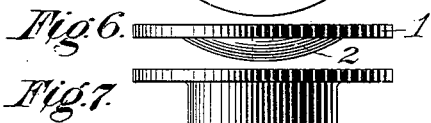
Fig.6.
Fig.7.
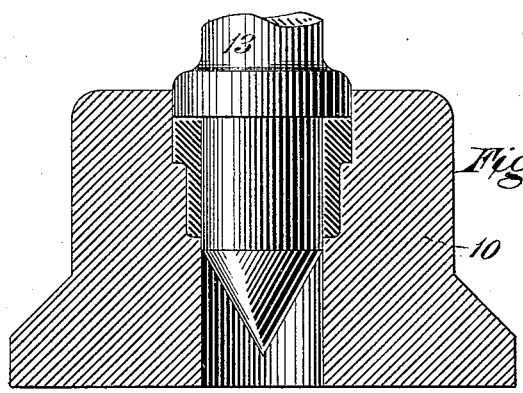
Fig.3.
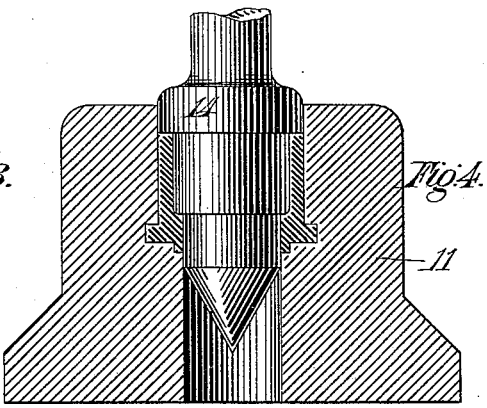
Fig.4.
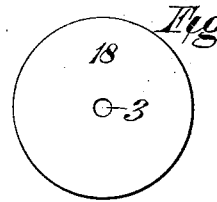
Fig.10. Fig.11.
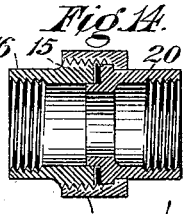
Fig.14.
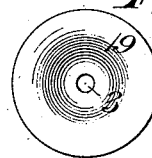Fig.12. 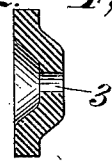Fig.13.
WITNESSES:
Darwin S. Wolcott
C. M. Clarke
INVENTOR,
James T. Hambay.
by George H. Christy
Att'y.
N. PETERS, Photo-Lithographer, Washington, D. C.

UNITED STATES PATENT OFFICE.

JAMES T. HAMBAY, OF PITTSBURG, PENNSYLVANIA.

MANUFACTURE OF PIPE-COUPLINGS.

SPECIFICATION forming part of Letters Patent No. 361,509, dated April 19, 1887.

Application filed January 28, 1886. Serial No. 190,023. (No model.)

*To all whom it may concern:*

Be it known that I, JAMES T. HAMBAY, residing at Pittsburg, in the county of Allegheny and State of Pennsylvania, a citizen of the United States, have invented or discovered certain new and useful Improvements in Pipe-Couplings and the Manufacture thereof, of which improvements the following is a specification.

In the accompanying drawings, which make part of this specification, Figure 1 is a sectional elevation of dies for stamping out flange and the several parts of screw-couplings. Figs. 2, 3, and 4 are similar views of dies for finally shaping the several parts of screw-couplings. Figs. 5 and 6 are plan and edge views of the form of blank used in forming flange-couplings. Fig. 7 is an edge view of a half of a completed flange-coupling. Figs. 8 and 9 are plan and sectional views of blanks used in forming certain parts of a screw-coupling. Figs. 10, 11, 12, and 13 are similar views of modified forms of blanks. Fig. 14 is a sectional view of a completed screw-coupling.

The invention herein relates to certain improvements in the method of forming wrought-iron or steel couplings for the connection of adjacent ends of pipe-sections forming a line of pipe.

In an application of even date herewith I have described and claimed a method of forming couplings, which consisted in forming a shell by bending and welding a suitably-shaped blank and stamping such shell into the desired shape. I now propose to form flange or screw couplings in such manner as to avoid all welded joints, which are at times defective, such welded coupling being formed by a series of flanging, drawing, and stamping operations effected in a suitably shaped blank, such blank being produced by rolling, forging, or in any other suitable manner.

In carrying out my improved method I form a blank, 1, having the circular enlargement 2 located at or around its center by rolling or forging, and then trimming into circular form, as shown in Fig. 5. These blanks may be formed in continuous lengths, if desired, the enlargements on such continuous lengths being arranged a distance apart proportional to the depth of flange to be formed on the coupling when completed.

The blank 1, having a hole, 3, drilled or otherwise formed through the enlargement 2, is placed in the female die 4, the center hole, 3, being arranged in line with the center of the opening 5 in said die. The annular die 6 is then brought down upon the portion of the blank outside of the enlargement 2, and firmly holds such portion of the blank against the face of the die 4. The punch 7 is then pressed down through the annular die, the point of said punch entering the hole 3. The punch 7 in its downward movement forces down and out the metal of the enlargement, and presses the metal of such enlargement into the recess 8 of the die 4, thus forming ready for threading one part or half of a flange-coupling.

In making screw-couplings I use a blank having a narrow rim or flange portion, and having nozzled such blank, as above described, I place such nozzled blank in one of the dies 9, 10, or 11 and impart the final shape to such blank by means of the punches 12, 13, or 14, acting in conjunction with the dies. These dies and punches are suitably constructed to form, respectively, the several parts of a screw-coupling, such as is shown in Fig. 14. In order that the necessary screw-threads may be formed on the shoulder 15 of the part 16 of the screw-coupling, it is desirable, if not necessary, that said shoulder should be sufficiently thick to permit of the cutting of one or more threads thereon, and, as it is not necessary that the nozzle or body portion of said part should be of equal thickness, I prefer to use the blanks 17, 18, or 19. (See Figs. 8, 10, and 12.) These blanks are made of a diameter equal to the greatest diameter of the part of the screw-coupling intended to be formed, and its flange or body portion of a thickness only slightly greater than the thickness of the shoulder on the finished part. When the thickness of the shoulder is considerably greater than the body portion of the completed part, I prefer to recess the central portion of the blank, as shown in Fig. 10, such recessed form of blank being especially adapted for the formation of the part 16. The blanks 18 and 19 are intended to be used in the manufacture of the male part 20 and the female part 21, respectively, of the screw-coupling.

Each of the above-mentioned blanks can be formed by rolling and cutting, or in any other suitable manner, and are nozzled, and then stamped to shape in the manner above described.

The couplings thus formed, whether flange or screw, are solid and weldless, and, being made of wrought-iron or steel, are free from any porosity, and have sufficient elasticity to resume their normal size even after being subjected to considerable strain or stretch while in use.

It will be understood that the die 11 is made in two or more parts, to permit of the withdrawal of the part of the coupling formed therein after being stamped to shape.

I claim herein as my invention—

1. As an improvement in the art of forming wrought-iron or steel couplings for pipes for the conveyance of fluids, the method herein described, which consists in rolling or forging a blank having an enlargement or re-enforce thereon, and then nozzling or flanging the re-enforced portion of the blank, substantially as set forth.

2. As an improvement in the art of forming wrought-iron or steel couplings for the conveyance of fluids, the herein-described method, which consists in rolling or forging a blank having an enlargement or re-enforce thereon, nozzling or flanging the re-enforced portion of such blank, and finally stamping such blank to shape, substantially as set forth.

3. As a new article of manufacture, a wrought-iron or steel coupling, consisting of a flange or body portion and an internally-threaded tube or nozzle formed integral with the body portion, substantially as set forth.

In testimony whereof I have hereunto set my hand.

JAMES T. HAMBAY.

Witnesses:
DARWIN S. WOLCOTT,
R. H. WHITTLESEY.